United States Patent [19]
Jones et al.

[11] Patent Number: 5,936,008
[45] Date of Patent: Aug. 10, 1999

[54] INK JET INKS CONTAINING TONER PARTICLES AS COLORANTS

[75] Inventors: Robert N. Jones, Fairport; Edward J. Radigan, Jr., Hamlin; Susan Robinette, Pittsford, all of N.Y.; Raj D. Patel, Oakville, Canada; Michael A. Hopper, Toronto, Canada; Grazyna E. Kmiecik-Lawrynowicz, Ontario, Canada; Garland J. Nichols, Wayne, N.Y.; Beng S. Ong, Mississauga, Canada

[73] Assignee: Xerox Corporation, Stamford, Conn.

[21] Appl. No.: 08/560,783

[22] Filed: Nov. 21, 1995

[51] Int. Cl.⁶ .................................................. C09D 11/10
[52] U.S. Cl. ...................... 523/161; 430/137; 524/599; 524/845; 260/DIG. 38; 106/31.13; 347/74; 347/102
[58] Field of Search .................... 523/161; 260/DIG. 38; 106/20 D, 22 R, 23 R, 31.13; 430/137; 524/599, 845; 347/74, 102

[56] References Cited

U.S. PATENT DOCUMENTS

| | | | |
|---|---|---|---|
| 4,627,875 | 12/1986 | Kobayashi et al. | 106/22 H |
| 4,659,383 | 4/1987 | Lin et al. | 106/27 A |
| 4,737,190 | 4/1988 | Shimada et al. | 106/22 K |
| 4,762,764 | 8/1988 | Ng et al. | 430/115 |
| 5,019,477 | 5/1991 | Felder | 430/115 |
| 5,156,675 | 10/1992 | Breton et al. | 106/22 R |
| 5,169,437 | 12/1992 | You | 106/20 D |
| 5,207,824 | 5/1993 | Moffat et al. | 106/22 R |
| 5,213,740 | 5/1993 | Fuller | 264/140 |
| 5,254,427 | 10/1993 | Lane et al. | 430/137 |
| 5,418,108 | 5/1995 | Kmiecik-Lawrynowicz et al. | 430/137 |
| 5,444,140 | 8/1995 | Paine et al. | 526/346 |
| 5,531,816 | 7/1996 | Wickramanayake | 106/20 R |
| 5,545,504 | 8/1996 | Keoshkerian et al. | 430/137 |
| 5,565,022 | 10/1996 | Wickramanayake | 106/22 R |
| 5,626,655 | 5/1997 | Pawlowski et al. | 106/31.27 |

OTHER PUBLICATIONS

K.R. Barton, "Sulfopolyesters: New Resins For Water-Based Inks, Overprint Lacquers, and Primers," American Ink Maker, Oct. 1993, pp. 70–72.

*Primary Examiner*—Marion McCamish
*Assistant Examiner*—John J. Guarriello
*Attorney, Agent, or Firm*—Oliff & Berridge, PLC

[57] ABSTRACT

An ink for ink jet printing includes a liquid vehicle comprising water and toner particles with a colorant dispersed in or associated with the toner particles. The ink composition combines the print quality advantages of xerographic printing with the economic advantages of ink jet printing, thereby providing waterfast, archival quality prints.

4 Claims, No Drawings

INK JET INKS CONTAINING TONER PARTICLES AS COLORANTS

BACKGROUND OF THE INVENTION

This invention relates to improved particulate inks for use in ink jet printing processes. More particularly, this invention relates to ink jet inks that can be used in various printing processes such as thermal ink jet and piezoelectric or acoustic ink jet processes to provide archival print quality comparable to that obtained in xerographic toner development systems.

Ink jet printing processes and apparatus for such processes are well known in the art. Major types of ink jet processes are thermal ink jet and acoustic or piezoelectric ink jet processes.

In thermal ink jet printing processes, the printer typically employs a resistor element in a chamber provided with an opening for ink to enter from a plenum. The plenum is connected to a reservoir for storing the ink. A plurality of such resistor elements is generally arranged in a particular pattern, called a primitive, in a printhead. Each resistor element is associated with a nozzle in a nozzle plate, through which ink is expelled toward a print medium, such as paper. The entire assembly of printhead and reservoirs comprises an ink jet pen. In operation, each resistor element is connected via a conductive trace to a microprocessor, where current-carrying signals cause one or more selected elements to heat up. The heating creates a bubble of ink vapor in the chamber, which, in turn expels a droplet of ink through the nozzle toward the print medium. In this way, firing of a plurality of such resistor elements in a particular order in a given primitive forms alpha numeric characters, performs area fill, and provides other print capabilities on the medium. The thermal ink jet printing process is described in more detail, for example, in U.S. Pat. Nos. 5,169,437 to You and 5,207,824 to Moffatt et al., the entire disclosures of which are incorporated herein by reference.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means such as a pulse converter and then applied to the piezoelectric oscillator. A change in pressure on the ink within an ink chamber in the printhead caused by the recording signal results in droplets of ink being ejected through an orifice to a recording medium. Such an ink jet system is described in more detail, for example, in U.S. Pat. No. 4,627,875 to Kobayashi et al., the entire disclosure of which is incorporated herein by reference.

A related printing method is the impulse, or drop-on-demand, ink jet printing process. Such impulse ink jet printing processes generally use a hot melt ink jet ink. For example, in the impulse printing process, the hot melt ink is heated into a fluid phase and is caused to form a convex meniscus at the printhead nozzle tip by hydrostatic pressure. This pressure causes the end of the ink bubble to intrude into an electrostatic field. The ink is then electrostatically drawn into a single file stream of drops that traverse the span between the tip of the nozzle and the carrier (paper, etc.). Such impulse printing processes, and hot melt inks for use therein, are described, for example, in U.S. Pat. No. 4,659,383 to Lin et al., the entire disclosure of which is incorporated herein by reference. A disadvantage of the impulse printing processes, however, is that the resultant print image has a waxy texture and appearance, sometimes referred to as crayoning, and which may smear when abraded due to the presence of wax in the hot melt ink jet ink. The resultant print image thus generally has a lower archival quality.

In these and other ink jet recording processes, it is necessary that the ink being used meet various stringent performance characteristics. Such performance characteristics are generally more stringent than those for other liquid ink applications, such as for writing instruments (e.g., a fountain pen, felt pen, etc.). In particular, some or all of the following conditions are generally required for inks utilized in ink jet printing processes:

(1) the ink should possess liquid properties such as viscosity, surface tension and electric conductivity optimized for the discharging conditions of the printing apparatus, such as the thermal ink jet heater temperature rise, the driving frequency of a piezoelectric electric oscillator or a thermal ink jet head, the geometry and materials of printhead orifices, the diameter of orifices, etc.

(2) the ink should be capable of being stored in the device for a long period of time between duty cycles without causing clogging of printhead orifices during use. In the most stressful case the device should be able to sit uncapped for hours or days and still be able to recover all jets when fired.

(3) the recording liquid should be quickly fixable onto recording media, such as paper, film, etc., such that the outlines of the resulting ink dots are smooth and there is minimal smearing of the printed image.

(4) the resultant ink image should be of high quality, such as having a clear color tone and high optical density. The ink image should also have a large color gamut ideally, equal to or better than, that obtained with laser xerographic printers.

(5) the resultant ink image should exhibit excellent waterfastness (water resistance) and lightfastness (light resistance).

(6) the ink should not chemically attack, corrode or erode surrounding materials such as the ink storage container, printhead components, orifices, etc.

(7) the ink should not have an unpleasant odor and should not be toxic or flammable.

(8) the ink should exhibit low foaming and good shelf life stability characteristics for properties such as particle growth, viscosity creep, pH stability, etc.

Various inks for ink jet printing processes are known in the art. For example, various ink jet inks are disclosed in U.S. Pat. Nos. 4,737,190 to Shimada et al. and 5,156,675 to Breton et al. Generally, the ink jet inks of the prior art are aqueous inks, comprising a major amount of water, a humectant and/or a co-solvent, and colorant. By selecting specific components such as humectants, colorant, or other components, it is possible to adjust the print characteristics of the resultant ink.

Another widely-used imaging method, which produces high (archival) quality images and prints, is known as xerography or electrostatographic imaging. Xerography generally includes processes such as electrophotographic and ionographic imaging. Such processes use dry or liquid toner and/or developer compositions to develop images.

Generally, the process of electrostatographic imaging includes the step of forming a charge on an imaging member in the form of an image, such as an image of an original document being reproduced, or a computer generated image written by, for example, a raster output scanner. This records an electrostatic latent image on the imaging member corresponding to the original document or computer-generated image. The recorded latent image is then developed by bringing oppositely charged toner particles into contact with it. This forms a toner powder image on the imaging member that is subsequently transferred to a substrate, such as paper. Finally, the toner powder image is permanently affixed to the substrate in image configuration, for example by heating and/or pressing the toner powder image. Such xerographic imaging processes are described in, for example, U.S. Pat. Nos. 4,762,674, 5,019,477 and 5,254,427.

Various xerographic imaging methods utilizing a black or colored toner composition produce images and prints having very high quality. Such images and prints generally have high fix, i.e., smear resistance, as well as excellent waterfastness and lightfastness, making such imaging methods preferred where archival quality images and prints are necessary. Such high archival quality has generally not been obtainable using ink jet printing processes. However, the ink jet printing processes possess an advantage over the xerographic imaging processes, in that the process and apparatus used in an ink jet printing process are generally cheaper and less cumbersome than in xerographic development processes. For example, both the material and operating costs of an ink jet printing process are generally cheaper than for a xerographic development process.

Accordingly, ink jet printing has become one of the fastest growing segments in the low volume printer market. However, ink jet printing systems, and particularly thermal ink jet printing systems, suffer from several print quality shortfalls as compared to xerographic development systems employing polymer resin based toners. These shortfalls include the following:

(1) Lack of 100% waterfastness in black and color inks. Although advances have recently been made to improve waterfastness, many of the ink jet ink compositions presently on the market do not achieve 100% waterfastness, and therefore are subject to smearing, line blooming, or other problems in high humidity atmospheres and the running of colors when prints come into contact with water.

(2) Lack of edge sharpness. It is important that the images exhibit high edge acuity, being sharp rather than ragged. Although some printers have addressed this problem by incorporating multipass printing and elaborate pixel management algorithms and/or heating of the imaging substrate, some edge raggedness still exists with the dye based color inks used in these printing systems.

(3) Inter-color bleed. Water-based ink jet printing processes suffer from a phenomenon known as inter-color bleed. This phenomenon is the bleeding of color from one freshly printed area into another at a boundary line before the water-based inks dry. This is most noticeable to the human eye when black text is printed on a yellow highlight background. Because the inter-color bleed occurs in much less than one second after printing, it cannot be eliminated by drying the imaging substrate after printing has occurred. Some printing systems have addressed the problem by controlling the printing process so that there is no "wet-on-wet" printing. However, this tends to slow down the printing process.

(4) Lack of saturation in colors on plain (so called office) paper. In ink jet printing processes, the highest quality prints have generally been obtained by printing on specially-designed coated papers. However, when standard uncoated papers are used, without heating of the paper before or during printing, the color saturation is lower, resulting in less acceptable prints. Thus while specially-designed coated papers may produce higher quality prints, they also increase the materials cost for ink jet printing processes.

(5) Show through. One reason for the reduced print quality of water based ink jet printing processes is that the colorant penetrates further into the surface of absorbent imaging substrates, such as paper. A direct result of the increased penetration into the paper surface is the problem known as "show through," i.e., the increased visibility, relative to xerographic prints, of the image from the back side of the paper. In addition to being objectionable in itself to some users, the show through problem also severely limits the possibility for duplex printing using ink jet inks on such papers.

(6) Paper latitude. Ink jet printing processes using water-based ink generally exhibit a smaller paper latitude as compared to xerographic imaging processes. For example, in printing processes that use only ambient temperature drying, the paper latitude is the worst. In such cases, paper variation leads to significant variation in print quality.

Although numerous water-based ink jet inks are presently available, they generally do not meet all of the above-described functional requirements to work well in ink jet printers, while also providing excellent print quality on plain paper. In particular, the inks generally used in ink jet printing processes, while producing acceptable print quality, do not produce the high print quality that is achieved by using toner compositions, such as in electrostatographic imaging processes.

Thus the need continues to exist in the ink jet industry for improved ink jet inks that satisfy the above-described functional requirements while at the same time providing high print quality prints with archival properties on a wide variety of recording media, including plain paper, transparencies and cloth. Especially useful are ink jet ink compositions that can provide archival quality prints equivalent to laser xerography without suffering from the above-described problems generally associated with ink jet inks.

SUMMARY OF THE INVENTION

The present invention provides ink jet ink compositions that provide high print quality and archival properties on a wide variety of print media, including paper, transparencies and cloth. Ink compositions of the present invention satisfy the various end-user requirements described above, including wide color gamut, excellent waterfastness and lightfastness equal to xerographic prints, good storage stability, and low odor and toxicity. The ink jet ink compositions of the present invention thus provide good to excellent print quality on a wide variety of media, including paper, transparencies and cloth, while also exhibiting the permanence necessary for archival quality prints. Significantly, the present invention provides ink compositions that provide improved adhesion of colorants on print media due to the incorporation of the colorants in, or association with, polymer binder resins, which are the same or similar to the binder resins used for xerographic toners.

The present inventors have discovered that an ink composition may be formulated by combining aspects of both xerographic toner formulation and manufacturing processes and ink jet ink formulation and manufacturing processes to provide a novel ink jet ink composition. The ink jet ink compositions of the present invention comprise modified toner-like particles as the colorant and binder, in a water based ink vehicle. Such ink compositions produce good print quality, comparable to the archival quality obtained with xerographic materials and development systems, but with the cost and materials advantages unique to ink jet systems. The ink compositions disclosed herein also avoid other print quality shortfalls such as the waxy texture and appearance of the hot melt ink jet inks used in impulse printing processes.

The present invention also provides an ink jet printing process, wherein the above-described ink jet inks are jetted onto a print medium, such as paper, transparencies or cloth. The resultant ink image formed In the ink jet printing process may in embodiments be fused as in xerographic imaging processes. That is, the resultant ink image may be fixed to the print medium by drying, employing any of the traditional ink jet processes such as ambient air drying, radiant heaters, microwave drying, UV curing or the like or may be fixed by fusing it to the print medium, for example by a heated pressure roller, as in xerographic imaging processes. A hybrid method of drying and fusing the ink image may also be employed.

Specifically, this invention provides an ink for ink jet printing, comprising a liquid vehicle comprising water, and toner particles with a colorant dispersed in or associated with said toner particles.

The present invention thus provides ink jet ink compositions, containing colored particles having a number average particle size of from tens of microns to submicron size and a method for preparing the same, wherein the colored particles are modified toner particles containing a colorant in a polymer resin binder, as well as an ink jet printing process and apparatus for use with the ink jet ink compositions.

DETAILED DESCRIPTION OF PREFERRED EMBODIMENTS

The ink jet printing process of the present invention generally combines aspects of ink jet printing processes with xerographic toner development processes. Specifically, the ink jet inks used in processes of the present invention are liquid vehicle inks, generally comprising water and/or one or more co-dispersants, but further comprising small sized (modified) toner particles.

Toner particles, as referred to herein, generally refers to a modified form of the toner particles traditionally used in the various xerographic imaging processes. In the present invention, the toner particles preferably have a number average particle size of from about 0.025 to about 10 microns, and more preferably from about 0.1 to about 2 microns. These particles are generally smaller than the toner particles used in the xerographic imaging processes, and thus may alternatively be referred to as "pre-toner" or "modified" toner particles. For ease of reference, these particles are referred to herein simply as "toner particles."

As used herein, "toner resin" refers to any of the various polymers commonly used to produce toner particles for xerographic imaging processes. Such polymers are known and are generally used for variants of the xerographic processes, including electrophotographic imaging and ionographic imaging using either liquid or solid developer compositions. Accordingly, the toner resin used in embodiments of the present invention may include polymers, copolymers, terpolymers and the like of any suitable monomeric units.

The monomers, polymers and copolymers which may be used to form the toner particles for use in ink jet inks of the present invention may include any such monomers, polymers or copolymers that are suitable for use in conventional toner particle production processes for forming toner resin materials. Examples of monomers suitable for use in the present invention include, but are not limited to, conjugated dienes and vinyl monomers. Typical examples of conjugated diene monomeric units include, but are not limited to, 1,3-butadiene, isoprene, 2,3-dimethyl-1,3-butadiene, piperylene, 3-butyl-1,3-octadiene, 2-phenyl-1,3-butadiene and the like, and mixtures thereof. Typical examples of vinyl monomeric units include, but are not limited to: styrene; p-chlorostyrene; vinyl naphthalene; vinyl chloride; vinyl bromide; vinyl fluoride; ethylenically unsaturated monoolefins such as ethylene, propylene, butylene, isobutylene and the like; vinyl esters such as vinyl acetate, vinyl propionate, vinyl benzoate, vinyl butyrate, and the like; esters of alpha-methylene aliphatic monocarboxylic acids such as methyl acrylate, ethyl acrylate, n-butyl acrylate, isobutyl acrylate, dodecyl acrylate, n-octyl acrylate, 2-chloroethyl acrylate, phenyl acrylate, methylalphachloroacrylate, methyl methacrylate, ethyl methacrylate, butyl methacrylate and the like; acrylonitrile; methacrylonitrile; acrylamide; vinyl ethers such as vinyl methyl ether, vinyl isobutyl ether, vinyl ethyl ether and the like; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole, N-vinyl pyrrolidene and the like; and mixtures thereof.

Specifically preferred monomers selected for the process bimodal resin of the present invention include styrene, butadiene, isoprene, and derivatives thereof.

For example, the toner resins that may be used to produce the ink jet compositions of the present invention may include the "chemical" toners as well as the "non-chemical" toners. By chemical toner is meant toner particles, generally produced in situ, by dispersing a pigment in a suitable solvent, forming a polymer resin in situ separately, and adhering the pigment to the polymer resin, in a subsequent processing step. In contrast, by non-chemical toner is meant toner particles that are generally formed by melt mix processes involving extruding a resin/colorant mixture, followed by grinding or otherwise breaking down the extruded mixture to the desired particle size. These various toner resins, including other toner resins known in the art, may be suitably employed in forming the ink jet ink compositions of the present invention.

A particular advantage of the present invention is that such ink jet inks may be formed in situ. That is, the toner particle suspension resulting from the toner particle formation process, which otherwise would be separated and optionally dried to produce xerographic toner particles, may instead be directly used to form a major component of the ink jet ink. Thus, while the method for producing the toner particles for use in the ink compositions of the present invention is not particularly limited, it is preferred in embodiments of the present invention that the final toner particle suspension be a mixture of the small sized toner particles in water and/or a co-dispersant. An emulsion/aggregation polymerization process, such as disclosed in U.S. Pat. No. 5,444,140 produces such a suspension and is therefore a preferred process in embodiments of the present invention. However, other toner particle formation processes may be used, with the toner particles optionally being purified, dried, classified, surface modified, and/or mixed with suitable organic and/or inorganic liquids to form the ink jet ink compositions of the present invention.

In embodiments of the present invention, the toner resin for use as the colorant particles may be produced by a starve fed or batch emulsion polymerization process. Accordingly, the toner resins may be produced by any of the various processes, such as disclosed in U.S. Pat. No. 5,444,140 and allowed U.S. patent application Ser. No. 08/264,210, entitled "Styrene/N-Butyl Acrylate Toner Resins With Excellent Gloss and Fix Properties," the entire disclosures of which are incorporated herein by reference. Another suitable polymerization process that may be used to form toner resins for use as the colored particles in the present invention, which allows for the production of toner resin particles with a controlled particle size and a selected morphology, is an emulsion aggregation process as disclosed in U.S. Pat. No. 5,418,108, the entire disclosure of which is incorporated herein by reference. Of course, it will be apparent to one skilled in the art that these and other processes may be adjusted so as to produce particles with different resin compositions and of a smaller particle size.

When incorporated into the ink jet ink compositions of the present invention, it is preferred that the toner particles be of a small size, so as to prevent clogging of printhead orifices and to satisfy the above-described requirements for ink jet inks. Accordingly, in embodiments of the present invention, it is preferred that the toner particles have a number average particle size (average diameter) of from about 0.025 micron to about 15 microns. More preferably, the average particle size of the toner particles is from about 0.05 micron to about 5 microns, and even more preferably from about 0.05 micron to about 1 micron. Toner particles having a particle size outside of these ranges may, of course, be used in ink jet ink compositions of the present invention, depending upon specific performance requirements of the ink composition and upon operational features of the printing apparatus.

Another feature of the ink jet ink compositions of the present invention is that the ink composition may contain up to about 25% or more by weight of the colored toner particles. Preferably, the ink jet ink compositions of the present invention contain from about 6% to about 20% by weight of the colored toner particles, and more preferably from about 10% to about 20% by weight.

In ink jet inks of the present invention, colorant is incorporated into or associated with the toner resin particles. For example, colorant may be mixed with and dispersed in the toner resin or may be physically or chemically bonded to or associated with the toner resin. The colorant may be either a dye or a pigment, or combinations of dyes and pigments may be used in some embodiments. In addition to being incorporated into the toner particles, additional dye and/or pigment may also be free in the liquid vehicle.

In embodiments of the present invention, the colorant for the ink jet ink compositions may be a pigment, a dye, or a mixture of one or more dyes and/or one or more pigments. When pigments are used, the pigment may be, for example, black, cyan, magenta, yellow, red, blue, green, brown, mixtures thereof, and the like. Examples of suitable black pigments include various carbon blacks such as channel black, furnace black, lamp black, and the like which may be used either as dry powders or in a predispersed form, such as Levanyl Black A-SF (Bayer) and Sunsperse Carbon Black LHD 9303 (Sun Chemicals). Colored pigments include red, green, blue, brown, magenta, cyan, and yellow particles, as well as mixtures thereof. Such color pigments may be used either in dry powder form or in a predispersed form. Illustrative examples of magenta pigments include 2,9-dimethyl-substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue Xo2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoace-tanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected.

Preferably, in embodiments of the present invention where pigments are used, the pigment particle size is as small as possible to enable a stable dispersion of the particles in the polymer resin. Preferred particle average diameters are generally from about 0.001 to about 1 micron. The particle size may depend, of course, upon the desired toner particle size and on the color characteristics of the particular pigment.

When dyes are used in the ink jet inks of the present invention, any suitable commercially available dye may be used to impart the desired color characteristics to the toner particles. The dyes used may be acid, direct or reactive dyes. Specific examples of suitable dyes include Bernacid Red 2BMN, Pontamine Brilliant Bond Blue A, BASF X-34, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E2-G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue HGF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Acid Yellow 17, Acid Red 52, and Direct Red 227, all available from Tricon; Projet Cyan 1, Projet Magenta 1T, and Projet Yellow 1G, all available from Zeneca; mixtures thereof, and the like. Dyes that are invisible to the naked eye but detectable when exposed to radiation outside the visible wavelength range (such as ultraviolet or infrared radiation), such as dansyllysine, N-(2-aminoethyl)-4amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl) benzoxazoles, 4,4-bis(triazo2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl) coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

In a preferred embodiment of the present invention, the ink jet ink composition includes a dye as imparting part or all of the colorant properties to the ink jet ink. In this embodiment, the toner resin particles may, if desired, contain a colorant such as a pigment in addition to a dye. As described above, the dye may be either dissolved in the liquid vehicle, or may be diffused into the polymer resin particles. However, an advantage of the ink jet inks of the present invention is that when the dye diffuses into the toner particles, the ink provides improved print quality without sacrificing print characteristics such as jettability.

An advantage of the dye-based inks of embodiments of the present invention is that they possess improved functional characteristics over ink jet inks of the prior art. Because it is possible for the dye to diffuse into the toner particles, rather than remaining dispersed only in solution in the ink vehicle, the dye does not penetrate as far into or through the print medium thereby reducing the show through and edge raggedness in printed images. Accordingly, since the dye is diffused or dispersed in the polymer resin, the waterfastness and lightfastness of the image are also improved.

The colorant may be present in the polymer resin forming the toner particles in any effective amount to impart the desired color properties to the ink. Such preparation of colored toner particles is well known to one skilled in the art. In general, the colorant (pigment and/or dye) is employed in an amount ranging from about 2% to about 80% by weight of the polymer resin.

Furthermore, in embodiments of the present invention, the ink jet ink compositions may include magnetic particles, for example, to enable the use of the ink jet ink compositions in a magnetic ink character reader (MICR) system. Suitable magnetic substances include, but are not limited to, needle-shaped magnetic substances, doped magnetic substances and heat-treated magnetic substances. For example, the compositions of the particular magnetic substances may include heat-treated magnetite, co-doped magnetite, needle magnetite and magnetite. Other suitable magnetic substances include, but are not limited to, ferromagnetic compounds including hard magnetic particles, soft magnetic particles or a mixture of hard and soft magnetic particles. The magnetically soft particles can be iron or another high-permeability, low-remanence material, such as iron carbonyl, certain of the ferrites, for example, zinc or mangenese ferrite, or permalloys. The magnetically hard particles can be iron oxide, other ferrites, for example, barium ferrite, chi-iron carbide, chromium dioxide or alloys of iron oxide and nickel or cobalt. When such magnetic particles are included in the ink jet ink compositions, they may be present in any effective amount, and are preferably of a particle size such that the jetting characteristics of the ink are not adversely affected.

Additionally, other internal and/or external additives may be added to the toner particles in known amounts for their known functions. However, because the toner particles are used in ink jet ink compositions, rather than in triboelectric development systems, it is unnecessary in embodiments of the present invention to incorporate certain additives into the toner particles. For example, charge enhancing additives, which are traditionally incorporated into toner particles, may preferably be omitted from the toner particles when used in the ink compositions of the present invention. Furthermore, other additives may be included in toner particles, for example to prevent charging of the particles.

In the present invention, the ink jet ink composition is generally formed by dispersing the toner particles in an ink vehicle, preferably by in situ formation of the toner particles, and adding any desired additives thereto. The toner particles may also be aggregated to the desired particle size, if necessary. For example, ink jet ink compositions of the present invention may be formed by the process described in copending U.S. patent application Ser. No. 08/536,235 now U.S. Pat. No. 5,679,724 (Attorney Docket No. JAO 34079) entitled "Submicron Particles for Ink Jet Inks" and filed on Sep. 29, 1995, the entire disclosure of which is incorporated herein by reference. The application describes a process for forming an ink jet ink composition, the process comprising combining (1) an emulsion of an emulsifiable polymer resin in an anionic medium with (2) a pigment and a cationic surfactant; aggregating particles in the mixture to a desired particle size; and optionally coalescing the aggregated particles. Other means of forming the ink jet ink compositions will be apparent to one skilled in the art based on the instant disclosure.

In a preferred embodiment of the present invention, the ink jet ink composition may be used directly from the toner particle polymerization process. That is, the ink jet ink may be formed in situ in the polymerization process. In most xerographic toner applications, the toner particles are separated from solution following their formation, and are then dried and if necessary classified. In the present invention, however, the solution of toner particles resulting from the polymerization process may itself form all or part of the ink jet ink. For example, the emulsion of water and surfactants used in the polymerization process may comprise the entire ink vehicle, or may be combined with additional water, co-solvents, co-dispersants and/or other additives to provide the final ink vehicle. In these embodiments, the toner particles need not be first separated from solution.

As will be apparent to one skilled in the art based upon the instant disclosure, the particle size of the toner particles may be adjusted to the desired range for the ink jet ink compositions by modifications to the toner production or polymerization process. For example, the desired particle size may be obtained by altering such aspects of the process as the type and concentration of surfactant used, the quantities of components used in the processes, or the manner in which the various components are introduced into the polymerization process for forming the toner polymer resin. Alternatively, a micro fluidizer, sandmill, attritor or other similar apparatus may be used to ensure that micron or submicron size particles with a narrow size distribution result.

In embodiments, the resultant mixture from the above-described process may be directly used as the final ink jet ink composition. Alternatively, in other embodiments, the toner particles may be separated and dried, and then redispersed in a suitable solvent or dispersant to form the ink composition. In each of these embodiments, the toner particles of the final ink jet ink composition are dispersed in a suitable liquid vehicle to emulsify the resin, thereby producing colored particulates having a desired particle size suitable for ink jet ink applications.

The result is a stable, homogeneous ink jet ink composition containing colored particulates having a number average particle size of from about 0.025 micron to about 15 microns, wherein the colored particulates comprise toner particles.

The liquid vehicle of the inks of the present invention may consist of water, or various co-solvents and/or co-dispersants may also be added to the water vehicle, if desired. For example, the solution of water and surfactants in which the ink composition is formed may directly form a major proportion of the ink vehicle. In embodiments of the present invention, however, it is preferred that water be used alone as the dispersant in the ink vehicle. This allows for the preparation of co-solventless inks, which are more environmentally friendly. The use of one or more co-solvents or co-dispersants is therefore optional.

When a co-solvent or co-dispersant is used, it is preferred that the co-solvent or co-dispersant is a miscible organic component. Examples of suitable co-solvents include, but are not limited to, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides, sulfoxides such as dimethyl sulfoxide, lactones, mixtures thereof and the like.

When mixtures of water and one or more co-solvents or co-dispersants are selected as the liquid vehicle, the ratio of water to co-solvent may be in any effective range. Typically the ratio of water to co-solvent is from about 100:0 to about 20:70, preferably from about 97:3 to about 50:50, although the ratio can be outside these ranges. The non-water component of the liquid vehicle, when present, generally serves as a humectant, which typically has a boiling point higher than that of water. For example, suitable humectants include, but are not limited to, glycols, N-methyl-pyrrolidone, 2-pyrrolidone, N-methyl-2-pyrrolidone, 1,2-dimethyl-2-imidazolidinone, mixtures thereof and the like. Humectants may be included in the ink to prevent water evaporation and sedimentation. Additionally, certain humectants such as N-methylpyrrolidone and 2-pyrrolidone have been found to improve dye solubility in the ink and thus serve the dual role as humectant and co-solvent. In addition, some humectants such as 2-pyrrolidone have been found to resist ink build-up on jet faces during extended printing, which is preferred for cartridge refillability.

Other components may also be incorporated into the inks of the present invention. For example, inks of the present invention may include such additives as biocides, buffering agents, anti-mold agents, pH adjustment agents, electric conductivity adjustment agents, chelating agents, anti-rusting agents, stabilizing agents and the like. Such additives may be included in the ink jet inks of the present invention in any effective amount, as desired. For example, such additives may be included in an amount ranging from about 0.0001 to about 4.0 percent by weight, and preferably from about 0.01 to about 2.0 percent by weight of the ink. The amount included will depend, of course, on the specific component being included.

Examples of buffering agents include, but are not limited to, agents such as sodium borate, sodium hydrogen phosphate, sodium dihydrogen phosphate, mixtures thereof and the like. Examples of biocides include, but are not limited to, Dowicil™; Proxel; benzoate salts; sorbate salts; mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight, and preferably from about 0.01 to about 1 percent by weight.

Other additives may also be added. For example materials such as, trimethylol propane may be added to the ink jet ink compositions, for example, to reduce paper curl or as an anti-cockle agent.

Other suitable additives are disclosed, for example, in U.S. Pat. No. 4,737,190 to Shimada et al., the entire disclosure of which is incorporated herein by reference.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 0.7 to about 15 cP at 25° C. Preferably, the viscosity is from about 1 to about 10 cP, more preferably from about 1 to about 5 cP. It is also preferred that the ink jet ink composition has a surface tension of from about 10 to about 75 dynes/cm at 25° C. More preferably, the surface tension is from about 20 to about 70 dynes/cm, and even more preferably from about 25 to about 60 dynes/cm.

Because the colorant material in the ink jet ink compositions of the present invention is, in fact, modified toner particles, the ink jet ink compositions of the present invention provide the archival print quality of xerographic imaging processes while utilizing the ink jet printing process to form images on media. Accordingly, the printed image on the print medium may be fixed by any of the various fixing methods known in the art. For example, the image may be fixed as in xerographic processes by fusing the image onto the print medium, or may be dried as in conventional ink jet processes. In embodiments of the present invention where the image is fixed by drying, it may be air-dried at ambient temperatures, or may be dried by heating using any of the various means such as radiant heating, microwave heating, forced hot air heating, convection heating, vacuum drying, and the like. Such means for drying the image in an ink jet printing process are described, for example, in U.S. Pat. No. 5,371,531, the entire disclosure of which is incorporated herein by reference. Furthermore, in embodiments of the present invention, it is possible to fix the image by a hybrid method, combining both the drying used in conventional ink jet processes and the fusing used in conventional xerographic processes.

Because the ink jet ink compositions of the present invention combine the print quality advantages of xerographic imaging with ink jet ink processes, significant improvements over prior art methods are provided. Such performance improvements are provided with respect to shortfalls of ink jet ink compositions described above. 100% waterfastness is provided as a direct result of the colorant being toner particles that may be fused onto the print medium, rather than being water-soluble colorants that penetrate into the print medium. Because the toner particles do not as easily follow the liquid vehicle front and wick into the fibers of the print medium as compared to the water-soluble colorants of conventional ink jet ink compositions, higher levels of edge sharpness can be obtained, that are equivalent to levels obtained in xerographic toner development processes. For the same reason, inter-color bleed is prevented when colors are printed side by side on the print medium. Such inter-color bleed is prevented without slowing the printing process by waiting for one color to dry before the next color is printed. Similarly, because the colorant does not penetrate as deeply into the print medium, and because the ink jet ink compositions of the present invention allow for high colorant loading in the ink vehicle, increased color gamut is provided. The color gamut provided on plain paper is equivalent to the color gamut previously available only on specially-designed coated papers. The ink jet ink compositions of the present invention also exhibit excellent paper latitude with little or no show through, thus allowing duplex printing on a wide variety of print media.

As a result of the above-described performance improvements, and due to the increased versatility and higher print quality of the ink jet ink compositions of the present invention, the applicability and usefulness of ink jet printing processes may be enhanced. For example, the ink jet ink compositions of the present invention allow for the ink jet printing processes to be applied to the printing of textiles, such as cloth, to provide high quality and waterfast images at a significant cost savings as compared to the traditional xerographic printing methods.

The invention will now be described in detail with reference to specific preferred embodiment thereof, it being understood that these examples are intended to be illustrative only. All parts and percentages are by weight unless otherwise indicated.

EXAMPLES

Example 1
Preparation of Toner Polymer Latex Emulsion

A styrene/butyl acrylate/acrylic acid latex emulsion is prepared according to the process described in U.S. Pat. No. 5,418,108. In particular, a polymer latex is prepared by the emulsion polymerization of styrene, butyl acrylate and acrylic acid (82/18/2 parts) in a nonionic/anionic surfactant solution as follows. In a reaction vessel are mixed 352 grams of styrene, 48 grams of butyl acrylate, 8 grams of acrylic acid, and 12 grams of dodecanethiol. To the reaction vessel is added 600 milliliters of deionized water in which 9 grams of sodium dodecyl benzene sulfonate anionic surfactant (NEOGEN R™, which contains 60% of active component), 8.6 grams of polyoxyethylene nonyl phenyl ether nonionic surfactant (ANTAROX 8971™, which contains 70% of active component), and 4 grams of ammonium persulfate initiator are dissolved. The resulting emulsion is then polymerized at 70° C. for 8 hours. The resulting latex contains 40% by weight of solids.

Example 2
Preparation of a Black Ink Jet Ink Composition

A black colored ink jet ink composition is prepared using the styrene/butyl acrylate/acrylic acid polymer emulsion of Example 1. A toner particle dispersion is formed by mixing 90% by weight of the polymer of Example 1 with 10% by weight of the colorant black Hoechst TS, and aggregating and coalescing toner particles in the dispersion. The aggregation and coalescence is conducted using the process described in U.S. Pat. No. 5,418,108, except that the average particle size of the toner particles is reduced to a smaller size. The result is a black dispersion of toner particles in a liquid medium, with the toner particles having an average particle size of about 0.20 micron. The dispersion contains 10% loading of the colorant black Hoechst TS. Because the ink composition is already an aqueous solution, no further processing of the composition is required before its use in an ink jet printing process.

The black ink jet ink composition is tested for print quality. The ink is filled into a print cartridge for a Hewlett-Packard (HP) 1200C printer, and is jetted in the HP 1200C printer. Images using the black ink jet ink composition are successfully made on acidic and alkaline plain papers, and on transparencies. The resultant print image is found to have acceptable print quality and demonstrates minimal rub off.

Examples 3–5
Preparation of Cyan, Magenta and Yellow Ink Jet Ink Compositions

Following the same procedures as in Example 2, cyan, magenta and yellow ink jet ink compositions are prepared. In Example 3, the colorant Sunsperse Cyan is used to form a dispersion of cyan colored toner particles having an average particle size of about 0.41 micron, wherein the dispersion contains 6.5% loading of the colorant Sunsperse Cyan (4% by weight pigment). In Example 4, the colorant Sunsperse Magenta is used to form a dispersion of magenta colored toner particles having an average particle size of about 0.37 micron in a liquid vehicle, wherein the dispersion contains 7.5% loading of the colorant Sunsperse Magenta (0.87% pigment by weight). In Example 5, the colorant Sunsperse Yellow is used to form a dispersion of yellow colored toner particles having an average particle size of about 0.52 micron in a liquid vehicle, wherein the dispersion contains 12% loading of the colorant Sunsperse Yellow (1.39% pigment by weight).

The colored ink jet ink compositions of Examples 3–5 are tested for print quality as in Example 2. Printed images on acidic and alkaline papers and on transparencies are found to have acceptable print quality and demonstrate minimal rub off.

Example 6
Preparation of a Cyan Colored Ink Jet Ink Composition

A further cyan colored ink jet ink composition is prepared using the cyan dispersion of Example 3. The water content in the cyan dispersion of Example 3 is reduced by 10% by weight. Ethylene glycol is added to the dispersion in the same amount as the water that is removed to bring the dispersion back to the original volume. The resultant ink mixture is roll milled for 15 minutes prior to use. As in Example 2, the ink is filled into an HP 1200C print cartridge and jetted on an HP 1200C printer. Printed images are successfully made on acidic and alkaline plain papers. In this Example, the addition of ethylene glycol is found to provide higher optical density in the printed image as compared to the printed images of Example 3.

Example 7
Preparation of a Latex Emulsion

A polymeric latex is prepared by polymerizing methyl methacrylate and butyl acrylate as follows. In a polymerization reaction vessel are mixed 48 grams of methyl methacrylate, 24 grams of butyl acrylate and 225 milliliters of deionized water. In the mixture is dissolved 1.5 grams of sodium lauryl sulfate, 1.5 grams of Triton X-100 and 0.2 gram of ammonium persulfate initiator. An emulsion polymerization is conducted in the reaction vessel at 55° C., at which time 8 grams of acrylic acid, 0.2 grams of ammodium persulfate and 25 grams of deionized water are added to the reactor vessel at a flow rate of 4 milliliters per minute. The reaction temperature is increased to 80° C. for polymerization for 3 hours. A latex containing 25% solids by weight, with an average particle size of about 81 nanometers as measured on the Nicomp light scattering instrument is obtained. The polymeric latex is found to have a glass transition temperature of 68° C., as measured on a Seiko DSC.

Toner particles are formed from the polymeric latex as follows. In 20 grams of deionized water containing 0.5 gram of benzalkonium chloride cationic surfactant is dispersed 10 grams of Hostafine Yellow pigment (40% by weight solids) using a Waring blender. The dispersion is then homogenized with an Ultra-Turrax probe for two minutes at 10,000 rpm, while 30 grams of the polymeric latex is slowly added. The mixture is poured into a 500 milliliter reaction flask. The mixture is then heated to 90° C. for two hours to coalesce the particles.

Examples 8–10
Preparation of Yellow Ink Jet Ink Compositions

To the toner particle dispersions of Example 7 are added various co-dispersants to prepare ink jet ink compositions. In Example 8, 30 grams of the toner particle dispersion are added to 8 grams of sulfolane and 2 grams of trimethylol propane. In Example 9, 31 grams of the toner particle dispersion are added to 3.5 grams of ethylene glycol and 0.5 gram of isopropanol. In Example 10, 33.2 grams of the toner particle dispersion are added to 1.75 grams of ethylene glycol and 0.5 gram of isopropanol. In each of Examples 8–10, the ink mixture is roll milled for 30 minutes prior to use.

As in Example 2, above, the ink jet ink compositions of Examples 8–10 are filled into HP 1200C print cartridges and are jetted on an HP 1200C printer. Printing of each of the ink jet ink compositions is conducted on acidic and alkaline plain papers, and are found to provide acceptable print quality.

What is claimed is:

1. An ink-jet recording process comprising ejecting ink droplets from an orifice in accordance with a recording signal to form an image on a recording medium, wherein said ink comprises a liquid vehicle, toner particles and a colorant;

fixing said image on said recording medium, wherein said fixing step comprises at least one member selected from the group consisting of air drying, vacuum drying, and pressure fusing said image onto said recording medium; and wherein said toner particles comprise a polymeric resin selected from the group consisting of vinyl naphthalene, vinyl halide, ethylenically unsaturated monoolefins, esters of alphamethylene aliphatic monocarboxylic acids, vinyl ketones, vinylidene halides, and N-vinyl indole.

2. The process of claim 1, wherein said colorant is a pigment.

3. The process of claim 1, wherein said colorant is a dye.

4. The process of claim 1, wherein said fixing step comprises fusing said image on said recording medium using a heated pressure roller.

* * * * *